(12) United States Patent
Tomimatsu et al.

(10) Patent No.: US 6,306,535 B1
(45) Date of Patent: *Oct. 23, 2001

(54) MOLTEN CARBONATE FUEL CELL

(75) Inventors: Norihiro Tomimatsu, Kawasaki; Hideyuki Ohzu, Yokohama; Yoshihiro Akasaka, Kawasaki; Kazuaki Nakagawa, Yokohama, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/277,745

(22) Filed: Mar. 29, 1999

(30) Foreign Application Priority Data

Mar. 30, 1998 (JP) .................................................. 10-083103

(51) Int. Cl.⁷ ............................... H01M 8/14; H01M 8/00
(52) U.S. Cl. ................................. 429/33; 429/16; 429/46; 429/34
(58) Field of Search ................................ 429/16, 46, 33, 429/34

(56) References Cited

U.S. PATENT DOCUMENTS

| 3,658,597 | * | 4/1972 | Gray . | |
| 4,710,436 | * | 12/1987 | Nakamura et al. | 429/41 |
| 5,453,101 | * | 9/1995 | Ong | 29/623.5 |
| 5,580,673 | * | 12/1996 | Farooque et al. | 429/41 |
| 5,595,832 | | 1/1997 | Tomimatsu et al. . | |
| 5,827,495 | | 10/1998 | Tomimatsu et al. . | |
| 5,983,488 | * | 11/1999 | Erickson et al. | 29/731 |

FOREIGN PATENT DOCUMENTS 63-16566   1/1988 (JP) .
6-150947   5/1994 (JP) .

* cited by examiner

Primary Examiner—Gabrielle Brouillette
Assistant Examiner—Tracy Dove
(74) Attorney, Agent, or Firm—Oblon, Spivak, McClelland, Maier & Neustadt, P.C.

(57) ABSTRACT

A binder layer is formed on a surface of ceramic powder. This ceramic powder is formed into a sheet to form a sheet for an electrolyte plate of a molten carbonate fuel cell, to which a carbonate electrolyte is impregnated, thereby an electrolyte plate is constituted.

14 Claims, 3 Drawing Sheets

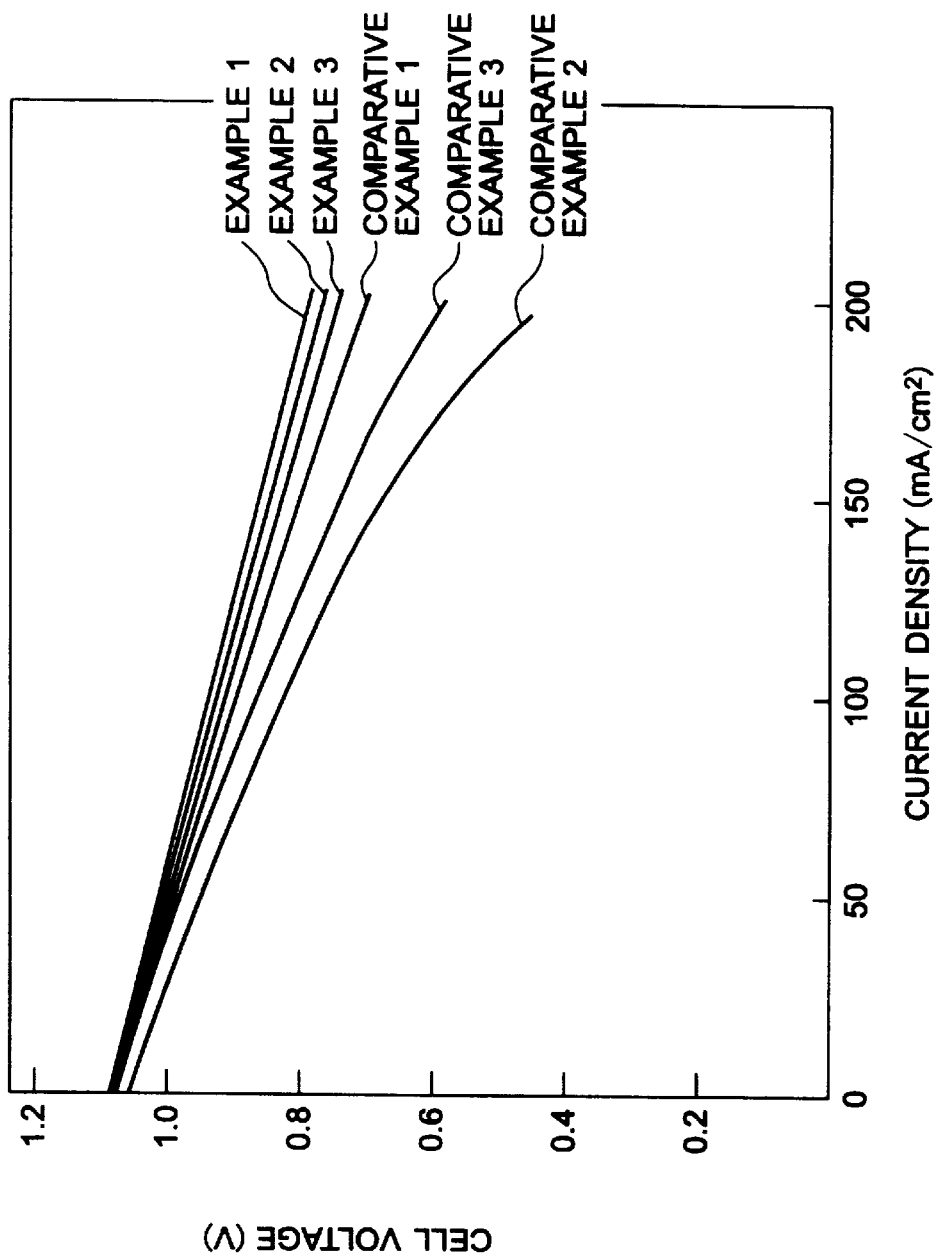

MOLTEN CARBONATE FUEL CELL

BACKGROUND OF THE INVENTION

1. Field of the Invention

The present invention relates to powder for an electrolyte plate of a molten carbonate fuel cell, and a sheet and a molten carbonate fuel cell using it.

2. Description of Related Art

An existing molten carbonate fuel cell is constituted by stacking a plurality of unit cells through separators for forming flowing courses of reaction gases to the respective gas diffusing electrodes, and by connecting electrically the respective cells. Each of the unit cells comprises a pair of oppositely disposed gas diffusing electrodes, that is, a fuel electrode (anode) and an oxidant electrode (cathode), and an electrolyte plate which is interposed by these gas diffusing electrodes and carries an electrolyte of an alkali metal carbonate. The molten carbonate fuel cell is operated in such a manner that a carbonate is melted under high temperature, a fuel gas containing hydrogen and carbon monoxide is supplied to the fuel electrodes of the respective cells, and a gas mixture containing air and carbon dioxide is supplied to the oxidant electrodes.

An electrolyte plate is formed of an electrolyte consisting of an alkali metal carbonate, a carrying member for preventing the electrolyte, which becomes liquid under high temperature operation, from spilling, and a reinforcing member for preventing the crack from occurring during the rise and fall of temperature. And, as its manufacturing method, particles of the carrying member and reinforcing member, and an organic binder are dispersed in an organic solvent to prepare a slurry thereof, which is poured onto a carrier sheet, then, by use of a doctor blade, a green sheet is formed. Thereafter, the green sheet is degreased to form a sheet of a porous body having an appropriate pore structure (matrix sheet), then, to this sheet of a porous body, an alkali metal carbonate is impregnated. This is a prevailing manufacturing method.

Upon forwarding a larger capacity of a molten carbonate fuel cell, the mass-production and larger size of the electrolyte plate are demanded strong. However, in the aforementioned doctor blade method, since it takes a long time to evaporate the solvent, when large green sheets are being manufactured in large quantities, many doctor blade devices and long manufacturing time are necessary. Further, in the doctor blade method in which surfaces of the particles are covered by a binder in a slurry state to combine particles themselves, in order to form a sheet which is not cracked even after evaporation of the solvent, the binder is required to sufficiently fill the gaps between particles, that is, the addition of a large amount of the binder is required. Therefore, the cost goes up, and since a huge amount of hazardous gas is generated during degreasing of the huge amount of the binder, this is not recommended from an environmental point of view.

Thus, the doctor blade method, being slow in the manufacturing speed, is inadequate for making the size of the electrolyte plate larger and for mass-production thereof, moreover, since a huge amount of the binder is required, there are problems from the cost and environmental points of view.

SUMMARY OF THE INVENTION

This invention is disclosed in Japanese Patent Application No. 10-083103 filed on Mar. 30, 1998, and the entire disclosure thereof is incorporated herein by reference.

It is an object of the present invention to provide a powder for an electrolyte plate of a molten carbonate fuel cell which, by enhancing the manufacturing speed of the electrolyte plate for the molten carbonate fuel cell, can accomplish mass-production and the larger size thereof, and, at the same time, by reducing the amount of an organic binder used, can reduce the cost and environmental pollution, and a sheet and a molten carbonate fuel cell using it.

According to one aspect of the present invention, a powder for an electrolyte plate of a molten carbonate fuel cell comprises ceramic powder which has a binder layer on the surface thereof.

Such powder for an electrolyte plate by letting it pass between a pair of heat rollers while being interposed between plates of good thermal conductivity, can be formed easily and rapidly into a sheet for an electrolyte plate. Thereby, mass-production and larger size thereof can be easily attained. Further, compared with the doctor blade method, the amount of the binder used can be reduced, thereby, the cost reduction and suppression of generation of the hazardous gas during degreasing can be attained.

Therefore, according to another aspect of the present invention, a sheet for an electrolyte plate of a molten carbonate fuel cell includes ceramic powder which has a binder layer on the surface thereof and is formed into a sheet by adhering the ceramic powder to the binder layer.

According to a further aspect of the present invention, a molten carbonate fuel cell includes a pair of gas diffusing electrodes, and an electrolyte plate interposed between the gas diffusing electrodes. The electrolyte plate is formed by letting a carbonate electrolyte carry in a sheet including a ceramic powder which has a binder layer on the surface thereof which has been removed by degreasing.

BRIEF DESCRIPTION OF THE DRAWINGS

FIG. 4 is a graph showing the characteristics of the unit cells according to the examples 1–3 and the comparative examples 1–3.

DESCRIPTION OF PREFERRED EMBODIMENTS

Embodiments of the present invention will be described.

Figure 1:
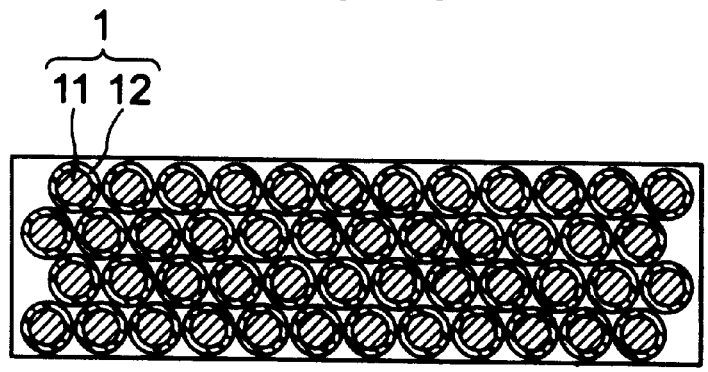
FIG. 1 is a cross section of an embodiment of a sheet for an electrolyte plate of a molten carbonate fuel cell according to the present invention.

FIG. 1 is a cross section of an embodiment of a sheet for an electrolyte plate of a molten carbonate fuel cell according to the present invention.

As shown in FIG. 1, this sheet has a structure that powder 1 is integrated into a sheet of a thickness of approximately 0.1 mm to 1 mm by heating under pressure. The powder 1 comprises ceramic powder 11 which is a carrying member for carrying electrolyte such as an alkali metal carbonate and a binder layer 12 disposed on the surface thereof.

As the ceramic powder 11, powder of, for instance, lithium aluminate, alumina, lithium stabilized zirconia, and zirconia can be employed, and among them, the powder mainly consisting of α-lithium aluminate is preferable. This is because α-lithium aluminate is excellent in stability against carbonate, and further powder of equal diameter and excellent dispersion can be obtained. Therefore, the coating of the binder is easy, and a dense and uniform sheet controlled of its porosity easily by a heat roller, which will be described later, can be obtained. Further, the average particle diameter of the ceramic powder 11 is preferably in the range of 0.2 μm to 0.6 μm, and more preferably in the range of 0.3 μm to 0.5 μm. When the average particle diameter is less than 0.2 μm, the ceramic powder can not exist stably in a cell, further, and when the average particle diameter exceeds 0.6 μm, the carrying property to the electrolyte becomes insufficient.

As a binder constituting the binder layer 12, one that softens in the temperature range of approximately 100° C. to 200° C. and is elastic at normal temperature is preferable. For example, an olefin based copolymer resin such as an ethylene-propylene copolymer resin, an olefin-acrylate based copolymer such as ethylene-ethyl acrylate copolymer resin, and an olefin-vinyl ester based copolymer resin such as an ethylene-vinyl acetate copolymer resin can be cited. Among them, the use of an ethylene-propylene copolymer resin that is excellent in its sheet formability is preferable. Further, an addition of a plasticizer to a binder can impart flexibility to the processed sheet. As such a plasticizer, phthalic acid series plasticizers can be cited, and among them, the use of dibutyl phthalate is preferable.

The thickness of the binder layer 12 is preferably in the range of 0.001 μm to 0.06 μm, and more preferably 0.01 μm to 0.03 μm. If it is less than 0.001 μm, the binding force between particles becomes insufficient, in addition, crack is likely to occur. Further, if it is more than 0.06 μm, the microstructure tends to be coarse after degreasing.

In formation of the binder layer 12, for instance, a jet coating method, which employs a jet stream capable of coating while dispersing powerfully the particles of which a coagulating force is strong, can be employed preferably, because it can coat uniformly and at the desired thickness. Incidentally, in the case of the jet coating method being employed, for the solvent to dissolve the binder and so on, organic solvents such as toluene and methyl ethyl ketone can be used.

Further, as the amount of the binder, it is preferable to be 1% by weight or more and 40% by weight or less to the ceramic powder. This is because, when the amount of the binder is less than 1% by weight, the sheet is likely to crack after film formation, and further, when the amount of the binder exceeds 40% by weight, it takes a long time to vaporize the solvent. The amount of the binder is more preferably in the range of 5% by weight or more and 15% by weight or less.

In the sheet of the present invention, in order to reinforce the strength of the electrolyte plate, a reinforcing member can be included. That is, by including the reinforcing member, the electrolyte plate can be prevented from occurrence of the crack caused by a heat cycle accompanying start/stoppage of the cell. As the reinforcing member, coarse particles of the average diameter of approximately 5 μm to 50 μm consisting of the ceramic similar to the ceramic powder which is employed in the powder 1 for the carrying member, short filaments of the filament diameter of approximately 0.5 μm to 5 μm and of the filament length of not more than approximately 50 μm, long filaments of the filament diameter of approximately 1 μm to 15 μm and of the filament length of approximately 0.1 mm to 3 mm or the like, can be employed. Further, one that has a binder layer similar to that of the powder 1 for the carrying member on the surface of such ceramic particles or ceramic filaments can be employed. The mixing ratio of the reinforcing member to the powder 1 for the carrying member is preferable to be in the range of 90:10 to 60:40 by weight ratio. If the reinforcing member is too much from this range, the carrying effect on the electrolyte is deteriorated, and further, on the contrary, if the mixing ratio of the reinforcing member is too less, the reinforcing effect due to the reinforcing member can not be obtained sufficiently. The mixing ratio is more preferably in the range of 85:15 to 65:35.

Figure 2:
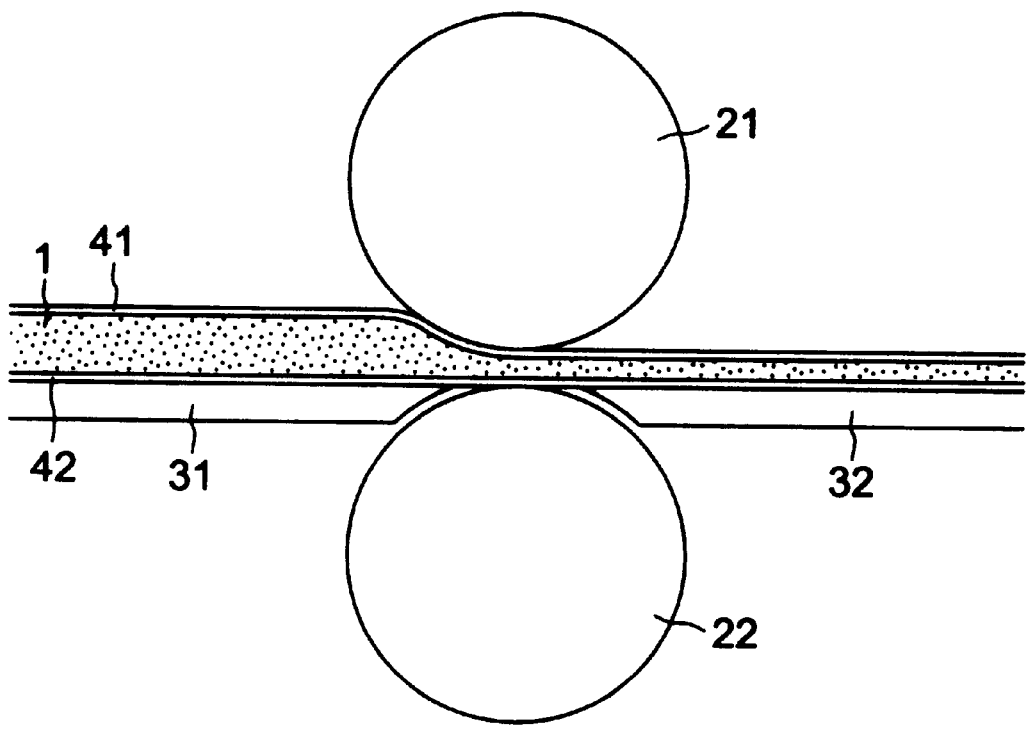
FIG. 2 is a diagram of an apparatus for manufacturing a sheet for an electrolyte plate of a molten carbonate fuel cell according to an embodiment of the present invention.

The aforementioned sheet for the electrolyte plate can be manufactured by use of an apparatus shown in FIG. 2.

In FIG. 2, a pair of heating rolls 21 and 22 are disposed above and below, and in front and back of these, a forward guide 31 and a backward guide 32 are disposed, respectively. The powder 1 is mixed with the aforementioned reinforcing member as the needs arise, while being interposed between two thin plates 41 and 42 of excellent thermal conductivity such as brass or aluminum, is sent from the forward guide 31 to between the heating rolls 21 and 22, and after being formed into a sheet by heating under pressure here, is sent to the backward guide 32. This apparatus, since the powder 1 is passed through between the heating rolls 21 and 22 while being interposed between the thin plates 41 and 42 of excellent thermal conductivity, can prevent the heating rolls 21 and 22 from damaging. Therefore it is economical from the manufacturing point of view.

According to the method, the sheets for the electrolyte plates can be manufactured continuously. Compared with the doctor blade method that requires approximately 6 hours for drying after casting, the manufacturing time can be drastically reduced.

Further, according to the present method, as shown in FIG. 1, the binder exists only on the surface of the particles. Therefore, compared with the doctor blade method in which gaps between the particles are filled by the binder, the amount of the binder can be reduced, thereby the cost can be reduced, and furthermore, the amount of the hazardous gas being generated during degreasing can be reduced.

In the present invention, all of the powder 1 is not necessarily required to be the powder 1 of which surface is covered by the binder layer 12, however, at least 30% or more of the total powder, including the powder of the reinforcing member, is preferable to be the powder of which surface has such a binder layer 12.

Next, a molten carbonate fuel cell of the present invention that is manufactured by use of the aforementioned sheet for the electrolyte plates will be described.

Figure 3:
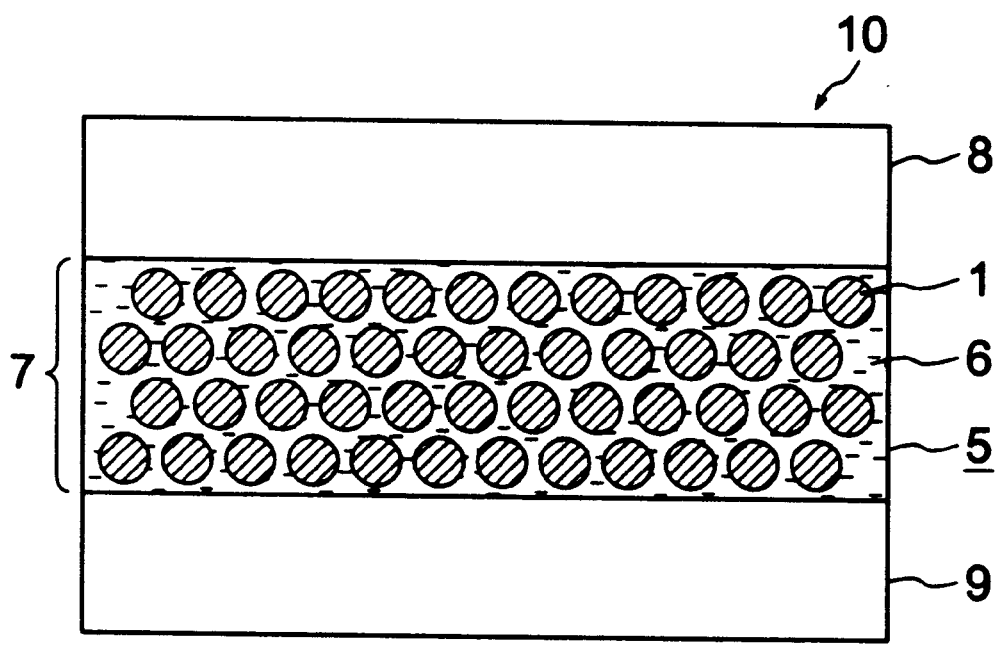
FIG. 3 is a diagram of an embodiment of a molten carbonate fuel cell according to the present invention.

FIG. 3 is a diagram of an embodiment of a molten carbonate fuel cell according to the present invention.

In FIG. 3, reference numeral 5 denotes an electrolyte plate in which electrolyte 6 such as alkali metal carbonate and so on is carried by a matrix 7 consisting of ceramic powder 1 formed by degreasing the aforementioned sheet for the electrolyte plate. On both main surfaces of the electrolyte plate 5, a fuel electrode 8 consisting of, for instance, Ni and an oxidant electrode 9 consisting of, for instance, NiO porous sintered compacts are disposed, respectively, thus a unit cell 10 is constituted.

Then, a plurality of layers of the unit cell 10 are stacked through conductive separators having supplying paths of the fuel gas and oxidant gas to constitute an electromotive structure, which are omitted from depiction, and, further, to the side surface of the electromotive structure, a manifold for supplying gas is attached, by fastening with a predetermined pressure from the stacking direction, a molten carbonate fuel cell is constituted.

The invention will now be explained in more detail by way of the following non-limiting examples.

EXAMPLE 1

By implementing respectively the jet coating of the solution, which included an ethylene-propylene copolymer resin dispersed in toluene, to the powder of α-lithium aluminate of an average particle diameter of 0.4 μm destined to be a carrying member and powder of α-lithium aluminate of an average particle diameter of 15 μm destined to be a reinforcing member, a layer of an organic binder of 10% by weight to the respective powders was formed on the surface thereof (layer thickness 0.03 μm).

Next, these powders were put into an alumina pot with a weight ratio of 70:30 to be mixed uniformly. The mixed powder, as shown in FIG. 2, was passed through between the heating rolls (140° C.) while being interposed between two sheets of thin brass plate, thus formed into a green sheet of a thickness of 0.3 mm. Existence of the crack and thickness deviation in the obtained sheet was measured. The results are shown in Table 1. Incidentally, the thickness deviation denotes the difference between the maximum thickness and the minimum thickness among the thicknesses which are obtained by measuring the total 9 points of intersections of the respective 3 straight lines drawn in the width direction and the length direction of the green sheet.

Subsequently, two pieces cut out of the sheet into an appropriate size were stacked interposing a mixed carbonate electrolyte ($K_2CO_3$:$Li_2CO_3$=38:62), on the both surfaces thereof, an anode consisting of Ni and a cathode consisting of NiO are disposed to assemble a unit cell. Next, while supplying fuel gas and oxidant gas to the anode and the cathode, respectively, the unit cell was heated up to 500° C. to impregnate the mixed carbonate electrolyte into the sheet. The characteristics of the unit cell in which the electrolyte was impregnated into the sheet are shown in FIG. 4.

EXAMPLES 2 and 3

By implementing identically with the embodiment 1 other than changing the coating amount of the organic binder to the respective powders to 5% by weight or 1% by weight as shown in Table 1, the powder of α-lithium aluminate of carrying member and powder of α-lithium aluminate of reinforcing member both of which had organic binder layers (layer thickness: 0.01 μm, 0.002 μm) on the surface thereof were obtained. Further, with these powders, as identical as the example 1, a green sheet of a thickness of 0.3 mm was formed, and the obtained respective sheets underwent the characteristic evaluation as identical as the example 1. The results are shown in Table 1.

Further, with the obtained respective sheets, as identical as the example 1, a unit cell was manufactured. The characteristics of the obtained unit cell are shown in FIG. 4.

Comparative Example 1

For comparison with the present invention, a green sheet for an electrolyte plate was manufactured by the doctor blade method.

First, the powder of α-lithium aluminate for a carrying member of an average particle diameter of 0.4 μm and powder of α-lithium aluminate for a reinforcing member of an average particle diameter of 15 μm were put into an alumina pot with a mixing ratio of 70:30 by weight to mix uniformly, to this mixed powder, 40% by weight of a mixed binder (the mixing ratio of 70:30 by weight) of polyvinyl butyral (binder) and dibutyl phthalate (plasticizer) and 40% by weight of toluene were added, and they were mixed in wet for 20 hours to prepare a slurry. This slurry was extended on a carrier sheet and dried for 6 hours at room temperature, thus a green sheet of 20 cm×20 cm×0.5 mm was prepared. The obtained sheet was measured of its characteristics as identical as example 1. The results are concurrently shown in Table 1.

Further, with this sheet, as identical as example 1, a unit cell was manufactured. The obtained characteristics of the unit cell are shown in FIG. 4.

Comparative Example 2

As identical as the comparative example 1 other than that the amount of the mixed binder was changed to 30% by weight, as shown in Table 1, a green sheet of 20 cm×20 cm×0.5 mm was prepared. The obtained sheet was measured of its characteristics as identical as example 1. The results are concurrently shown in Table 1.

Further, with this sheet, as identical as example 1, a unit cell was manufactured. The obtained characteristics of the unit cell are shown in FIG. 4.

Comparative Example 3

For comparison with the present invention, by use of a hot-press method, a green sheet for an electrolyte plate was manufactured.

First, an eutectic salt of lithium carbonate and potassium carbonate, and the powder of α-lithium aluminate for a carrying member of an average particle diameter of 0.4 μm, and the powder of α-lithium aluminate for a reinforcing member of an average particle diameter of 15 μm were put into an alumina pot with a respective weight ratio of 55:31.5:13.5, and they were mixed in the presence of acetone for 20 hours, thereafter dried. Then, the mixed powder was filled in a mold of 10 cm×10 cm of a hot press, which was heated up to 460° C. over 3 hours and held at 460° C. for 1 hour under the pressure of 300 kg/$cm_2$, thereafter, over 3 hours, was cooled down to 100° C., and the processed green sheet (thickness: 1.5 mm) was taken out. The obtained sheet was evaluated of the characteristics as identical as example 1. The results are shown in Table 1.

Further, with this sheet, as identical as example 1, a unit cell was manufactured. The characteristics of the obtained unit cell are shown in FIG. 4.

TABLE 1

|  | Binder content (weight %) | Processing temperature (° C.) | Manufacturing time period | Crack | Deviation of thickness (μm) |
|---|---|---|---|---|---|
| Example 1 | 10 | 140 | 1.5 min | no | 10 |
| Example 2 | 5 | 140 | 1.5 min | no | 14 |
| Example 3 | 1 | 140 | 1.5 min | no | 19 |
| Comparative Example 1 | 40 | 25 | 6 hr | no | 8 |
| Comparative Example 2 | 30 | 25 | 6 hr | yes | 13 |
| Comparative Example 3 | — | 460 | 7 hr | no | 110 |

As evident from Table 1, the manufacturing time of the green sheet of the present invention is made remarkably short compared with the comparative example, accordingly it is adequate for mass-production. Further, the thickness is far more uniform compared with comparative example 3 which employs the hot press method and comparable with comparative examples 1 and 2 due to the doctor blade method. Further, in the case of the doctor blade being employed, the crack occurs for the binder content of 30% by weight, whereas in the present invention, the crack is not observed even for only 1% by weight of binder content, thus, the use content of the binder can be reduced remarkably.

As described above in detail, according to the present invention, the manufacturing time period of an electrolyte plate of a molten carbonate fuel cell can be made remarkably short, accordingly, the mass-production and one of the large size can be attained. Further, since the use amount of the binder can be reduced, the cost can be reduced, and the environmental pollution can be suppressed.

What is claimed is:

1. A powder for an electrolyte plate of a molten carbonate fuel cell consisting essentially of
    coated particles, wherein each coated particle comprises a ceramic which has a binder layer on the surface thereof, wherein the binder layer has a thickness in the range of 0.001 $\mu$m to 0.06 $\mu$m.

2. The powder for an electrolyte plate of a molten carbonate fuel cell as set forth in claim 1,
    wherein the ceramic comprises α-lithium aluminate.

3. The powder for an electrolyte plate of a molten carbonate fuel cell as set forth in claim 1,
    wherein the ceramic powder has an average particle diameter of 0.2 $\mu$m to 0.6 $\mu$m.

4. The powder for an electrolyte plate of a molten carbonate fuel cell as set forth in claim 1,
    wherein the ceramic powder has an average particle diameter of 0.3 $\mu$m to 0.5 $\mu$m.

5. The powder for an electrolyte plate of a molten carbonate fuel cell as set forth in claim 1,
    wherein the binder layer comprises at least one kind of resin selected from the group consisting of an olefin based copolymer resin, an olefin-acrylate based copolymer resin, and an olefin-vinyl ester based copolymer resin.

6. The powder for an electrolyte plate of a molten carbonate fuel cell as set forth in claim 1,
    wherein the binder layer is a layer of at least one kind of resin selected from the group consisting of an ethylene-propylene copolymer resin, an ethylene-ethyl acrylate copolymer resin, and an ethylene-vinyl acetate copolymer resin.

7. The powder for an electrolyte plate of a molten carbonate fuel cell as set forth in claim 1,
    wherein the binder layer is a layer of an ethylene-propylene copolymer resin.

8. The powder for an electrolyte plate of a molten carbonate fuel cell as set forth in claim 1,
    wherein the binder layer contains a plasticizer.

9. The powder for an electrolyte plate of a molten carbonate fuel cell as set forth in claim 1,
    wherein a thickness of the binder layer is in the range of 0.01 $\mu$m to 0.03 $\mu$m.

10. The powder for an electrolyte plate of a molten carbonate fuel cell as set forth in claim 1,
    wherein the binder layer is formed by use of a jet coating method.

11. A sheet for an electrolyte plate of a molten carbonate fuel cell consisting essentially of
    coated particles, wherein each coated particle comprises a ceramic which has a binder layer on the surface thereof,
    wherein the coated particles are bonded to each other through the binder layers to form the sheet, wherein the binder layer has a thickness in the range of 0.001 $\mu$m to 0.06 $\mu$m.

12. The sheet for an electrolyte plate of a molten carbonate fuel cell as set forth in claim 11,
    wherein the ceramic comprises α-lithium aluminate powder.

13. The sheet for an electrolyte plate of a molten carbonate fuel cell as set forth in claim 11,
    wherein the coated particles are heated under pressure by use of heating rollers to form the sheet.

14. The sheet for an electrolyte plate of a molten carbonate fuel cell as set forth in claim 13,
    wherein a heating temperature of the heating rollers is in the range of 100° C. to 200° C.

* * * * *

UNITED STATES PATENT AND TRADEMARK OFFICE
CERTIFICATE OF CORRECTION

PATENT NO.      : 6,306,535 B1                                        Page 1 of 1
DATED           : October 23, 2001
INVENTOR(S)     : Norihiro Tomimatsu et al.

It is certified that error appears in the above-identified patent and that said Letters Patent is hereby corrected as shown below:

<u>Title page,</u>
Item [45], the Date of Patent should read:
-- [45]  Date of Patent:      Oct. 23, 2001 --
In the Notice section, the CPA information should be deleted. The Notice information should read:
-- [*]   Notice: Subject to any disclaimer, the term of this
                 patent is extended or adjusted under 35
                 U.S.C. 154(b) by 0 days. --

<u>Column 7,</u>
Line 28, "the ceramic powder has" should read -- the ceramic has --;
Line 32, "the ceramic powder has" should read -- the ceramic has --.

Signed and Sealed this

Tenth Day of December, 2002

JAMES E. ROGAN
*Director of the United States Patent and Trademark Office*